(12) United States Patent
Jones et al.

(10) Patent No.: US 6,975,496 B2
(45) Date of Patent: Dec. 13, 2005

(54) ISOLATED SHIELD COAXIAL SURGE SUPPRESSOR

(75) Inventors: Jonathan L. Jones, Carson City, NV (US); Richard C. Dunning, Carson City, NV (US); Mark J. Mattson, Carson City, NV (US)

(73) Assignee: PolyPhaser Corporation, Minden, NV (US)

( * ) Notice: Subject to any disclaimer, the term of this patent is extended or adjusted under 35 U.S.C. 154(b) by 344 days.

(21) Appl. No.: 10/393,417

(22) Filed: Mar. 20, 2003

(65) Prior Publication Data

US 2003/0179533 A1 Sep. 25, 2003

Related U.S. Application Data

(60) Provisional application No. 60/367,000, filed on Mar. 21, 2002.

(51) Int. Cl.$^7$ .................................................. H02H 1/00
(52) U.S. Cl. ....................................... 361/118; 361/119
(58) Field of Search ................................. 361/118, 119

(56) References Cited

U.S. PATENT DOCUMENTS

| 3,167,729 | A | * | 1/1965 | Hall ........................... 333/206 |
| 3,845,358 | A | | 10/1974 | Anderson et al. |
| 4,047,120 | A | | 9/1977 | Lord et al. |
| 4,262,317 | A | | 4/1981 | Baumbach |
| 4,359,764 | A | | 11/1982 | Block |
| 4,384,331 | A | | 5/1983 | Fukuhara et al. |
| 4,409,637 | A | | 10/1983 | Block |
| 4,554,608 | A | | 11/1985 | Block |
| 4,563,720 | A | | 1/1986 | Clark |
| 4,689,713 | A | | 8/1987 | Hourtane et al. |
| 4,727,350 | A | | 2/1988 | Ohkubo |
| 4,984,146 | A | | 1/1991 | Black et al. |
| 5,053,910 | A | * | 10/1991 | Goldstein .................... 361/111 |
| 5,057,964 | A | | 10/1991 | Bender et al. |
| 5,122,921 | A | * | 6/1992 | Koss ........................... 361/111 |
| 5,124,873 | A | | 6/1992 | Wheeler et al. .............. 361/58 |
| 5,321,573 | A | | 6/1994 | Person et al. |
| 5,617,284 | A | * | 4/1997 | Paradise ...................... 361/58 |
| 5,667,298 | A | | 9/1997 | Musil et al. |
| 5,790,361 | A | * | 8/1998 | Minich ........................ 361/111 |
| 5,953,195 | A | | 9/1999 | Pagliuca ...................... 361/120 |
| 6,061,223 | A | * | 5/2000 | Jones et al. .................. 361/119 |
| 6,115,227 | A | * | 9/2000 | Jones et al. .................. 361/119 |
| 6,236,551 | B1 | * | 5/2001 | Jones et al. .................. 361/119 |
| 6,281,690 | B1 | * | 8/2001 | Frey ............................ 324/754 |
| 6,721,155 | B2 | * | 4/2004 | Ryman ........................ 361/117 |
| 6,754,060 | B2 | * | 6/2004 | Kauffman .................... 361/119 |
| 6,785,110 | B2 | * | 8/2004 | Bartel et al. ................. 361/119 |

FOREIGN PATENT DOCUMENTS

CH  675933  11/1990
CH  675933 A5  11/1990

* cited by examiner

*Primary Examiner*—Stephen W. Jackson
*Assistant Examiner*—James Demakis
(74) *Attorney, Agent, or Firm*—Snell & Wilmer L.L.P.

(57) ABSTRACT

A surge protection device is disclosed that includes a conductor for receiving an rf signal and a dc current, a first shield having a lumen configured to accommodate at least a portion of the conductor, and a second shield having a lumen configured to accommodate the first shield so that a portion of the first shield is positioned within the lumen of the second shield. The surge protection device further includes a dc blocking device, coupled to the conductor, for attenuating the dc current, a device, coupled to the conductor, for diverting the dc current to the second shield, and a dielectric disposed between the first shield and the second shield for preventing the dc current from traveling from the second shield to the first shield.

20 Claims, 1 Drawing Sheet

ISOLATED SHIELD COAXIAL SURGE SUPPRESSOR

CROSS-REFERENCE TO RELATED APPLICATION

This application relates to and claims priority from U.S. Provisional Patent Application Ser. No. 60/367,000, filed Mar. 21, 2002, entitled "METHOD AND APPARATUS FOR MAINTAINING A UNIFORM IMPEDANCE CHARACTERISTIC IN A SURGE SUPPRESSOR DEVICE," which is herein incorporated by reference for all purposes.

BACKGROUND OF THE INVENTION

1. Field of the Invention

The present invention relates generally to the field of surge protection, and more particularly to an isolated shield coaxial surge suppressor.

2. Description of the Related Art

Surge protection devices protect electronic equipment from being damaged by large variations in the current and voltage across power and transmission lines resulting from lightning strikes, switching surges, transients, noise, incorrect connections, and other abnormal conditions or malfunctions. Large variations in the power and transmission line currents and voltages can change the operating frequency range of the electronic equipment and can severely damage and/or destroy the electronic equipment. Surge protection devices are typically placed in line with transmission lines and are located near the electronic equipment to be protected. Whenever a surge protection device is connected to a transmission line, it is possible that one end, e.g., a surge port, of the surge protection device is at one ground potential and the other end, e.g., a protected port, of the surge protection device is at another ground potential. This difference in potential can result in the flow of electrical current between the two grounds, which is typically referred to as a "ground loop". When a signal is transmitted along the transmission lines at various frequencies, such as between about 100 MHz to 6 GHz, and across the surge protection device, interference or distortion caused by the ground loop may alter the signal resulting in what is typically referred to as "hum". On a video screen, the interference or distortion caused by the ground loop may be seen as dark horizontal "hum bars" across the picture typically moving slowly from the bottom of the picture toward the top. The interference and distortion may modulate the signal trying to pass the surge protection device and may also corrupt the data encoded in the signal, thus making it unusable.

Several devices have been used to eliminate the undesirable effects caused by ground loops, but these devices have primarily focused on cancellation of the interference, rather than prevention. For example, a "hum-stop" or "hum-canceling" coil has been used to produce a cancellation of the low frequency power components on the signal lines. Typically, the hum-canceling coil is a coil of coaxial cable tightly wound around the signal lines.

These types of coils are expensive to manufacture with a wide band frequency response, and invariably produce an attenuation of higher frequencies, due to the long length of the cable contained in the coil. Compensation for this frequency loss requires extra circuitry, either as a pre-emphasis to the signal at the source end of the cable, or as a post-emphasis to the signal at the receiving end of the cable. In either case, there may be some degradation of the signal-to-noise ratio, and the additional circuitry may introduce non-linear distortions that can affect the differential phase or gain, or other characteristics, of the signal path.

Hence, one drawback of conventional surge protection devices is the difficulty in preventing ground loops. Another drawback of conventional surge protection devices is the interference and distortion, such as hum, caused by ground loops. Yet another drawback of conventional surge protection devices is the attenuation of higher frequencies and the degradation of the signal-to-noise ratio.

SUMMARY OF THE INVENTION

By way of example, one embodiment of the present invention is a surge suppressor device configured to maintain a uniform impedance characteristic. The surge suppressor device can include a housing having a surge port shield and a protected port shield, the surge port shield being positioned adjacent to the protected port shield, and a conductor, positioned within the housing, having a surge port for receiving an rf signal and a surge and a protected port for propagating the rf signal. The surge suppressor device can also include a surge blocking device coupled in series between the surge port and the protected port, a device, coupled to the surge port, for diverting the surge to the surge port shield, and a shield coupling dielectric positioned between the surge port shield and the protected port shield. This configuration can help to prevent the electrical surge from passing from the surge port to the protected port via the conductor or shields. Furthermore, this configuration can attenuate out of band frequencies from passing through the surge suppressor device while passing desirable in-band rf frequencies. Hence, the present invention provides a means of achieving coaxial surge suppression and electrical isolation between the surge port and the protected port.

Another embodiment of the present invention is an apparatus comprising a conductor having an input end and an output end, an input shield positioned around at least a portion of the input end of the conductor, and an output shield positioned around at least a portion of the output end of the conductor. The apparatus also might include a capacitor positioned between the input end of the conductor and the output end of the conductor, and a dielectric disposed between the input shield and the output shield for preventing dc current from coupling from the input shield to the output shield.

Another embodiment of the present invention is a surge protection device comprising a conductor for receiving an rf signal and a dc current, a first shield having a lumen configured to accommodate at least a portion of the conductor, and a second shield having a lumen configured to accommodate the first shield so that a portion of the first shield is positioned within the lumen of the second shield. The surge protection device further comprises a dc blocking device, coupled to the conductor, for attenuating the dc current, a device, coupled to the conductor, for diverting the dc current to the second shield, and a dielectric disposed between the first shield and the second shield for preventing the dc current from traveling from the second shield to the first shield.

Another embodiment of the present invention is a shield dielectric and a shield coupling capacitor or dielectric for maintaining a uniform impedance characteristic in the surge suppressor device while isolating the ports from dc continuity. The shield dielectric and the shield coupling dielectric can be positioned within the housing and preferably can be attached to an inner surface of the protected port shield. Hence, the shield dielectric and the shield coupling dielectric are positioned between the conductor and the protected port shield. An air gap may also be present between the conductor and the shield dielectric and the shield coupling dielectric. The inner surface of the protected port shield can be substantially cylindrical in shape and can be configured to be concentric with the conductor. In addition, the shield dielectric and the shield coupling dielectric can be substantially cylindrical in shape and can be configured to be concentric with the conductor.

Several advantages of the surge protection device include enhanced coupling of the desirable in-band rf frequencies, reduced amounts of rf leakage, isolation between the surge port and the protected port, preventing the electrical surge from passing from the surge port to the protected port via the conductor or shields and maintaining a uniform impedance characteristic. Additional advantages of the surge protection device include ultra low surge throughput specifications, wider operating frequency range per band types, small footprint area, stacked mechanical assembly, high voltage insulation between the surge port and the isolated or protected port, and mechanical capture of the isolated port.

For purposes of summarizing the present invention, certain aspects, advantages, and novel features of the present invention have been described herein. Of course, it is understood that not necessarily all such aspects, advantages or features will be embodied in any one particular embodiment of the present invention.

DETAILED DESCRIPTION OF THE PRESENTLY PREFERRED EMBODIMENTS

Surge protection devices that implement the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
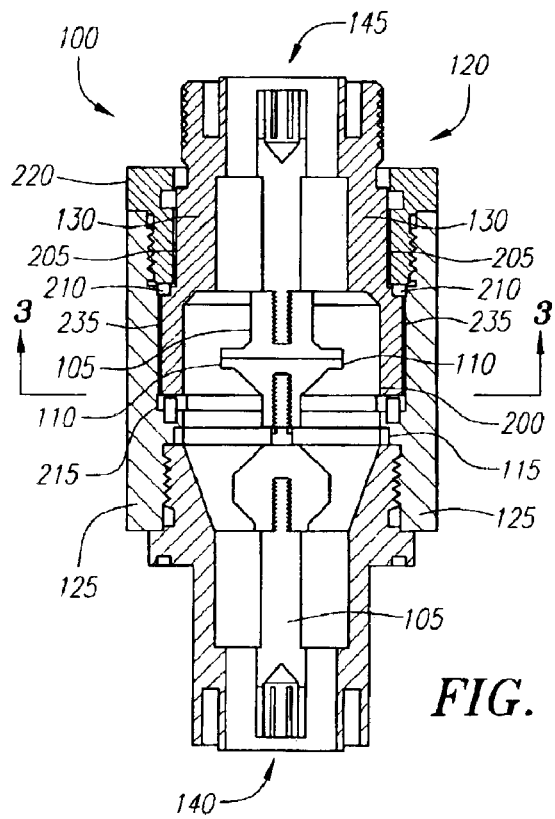
FIG. 1 is a schematic diagram of a surge suppressor device according to one embodiment of the present invention.

Referring now more particularly to the drawings, FIG. 1 is a schematic diagram of a surge suppressor device 100 according to one embodiment of the present invention. The surge suppressor device 100 can be used with a coaxial system, a fiber optic system or any other electrical or telecommunications system. The surge suppressor device 100 might include a conductor 105, a surge blocking device 110 such as a capacitor, and an inductor 115 that preferably has a planar spiral configuration. Other devices, such as a capacitor, a diode, a gas tube, a metal oxide varistor, or a resistor, can be used in place of or in combination with the inductor 115. The surge suppressor device 100 might also include a housing 120, which is sometimes referred to as a coaxial shield 120 (see also FIG. 2), having a surge port shield 125 and a protected port shield 130, and a capacitor 135, which is formed by circumferentially positioning a shield coupling dielectric 235 (see also FIGS. 2 and 3) between the surge port shield 125 and the protected port shield 130. The conductor 105 can be a coaxial cable, a fiber optic cable or any other means capable of propagating an ac signal. The conductor 105 has a surge port 140 that is configured to connect to an antenna or a transmission line (not shown) and a protected port 145 that is configured to connect to hardware and equipment (not shown) to be protected. The conductor 105 is configured to propagate ac signals, e.g., rf signals, and dc electrical energy, for example, lightning and electromagnetic pulse (EMP) surges. The protected port 145 can be floating or insulated to prevent ground loops.

During a surge event such as a lightning strike, the surge-blocking device 110 blocks the dc electrical energy and diverts the dc electrical energy to the inductor 115. Hence, the surge-blocking device 110 can block, for example, the destructive lightning energy and EMP surges, from passing through the conductor 105 or the housing 120. The dc electrical energy is shunted, via the inductor 115, to the surge port shield 125. The inductor 115 preferably has an inner arc configured to connect to the conductor 105 and an outer arc configured to connect to the surge port shield 125. Hence, the dc electrical energy travels along the inductor 115 to the surge port shield 125, which is connected to a system ground (not shown).

The coaxial shield 120 typically presents high impedance to out-of-band frequencies and attenuates its effects to in-band frequencies. Hence, out-of-band frequencies are generally not transferred from the surge port 140 to the protected port 145 and from the surge port shield 125 to the protected port shield 130. In addition, the dc electrical energy cannot travel from the surge port 140 to the protected port 145 because of the surge blocking device 110 and cannot travel from the surge port shield 125 to the protected port shield 130 because of the capacitor 135. Hence, no dc continuity exists between the ports 140, 145 of the conductor 105 or the shields 125, 130 of the housing 120. The surge blocking device 110 and the capacitor 135 can include a Teflon dielectric material capable of withstanding high voltages, for example, 4 kilovolts, while exhibiting low loss characteristics on the conductor 105 and the coaxial shield 120. In one embodiment, the shield coupling dielectric 235 is positioned between the surge port shield 125 and the protected port shield 130 to form the capacitor 135 (see also FIGS. 2 and 3). The shield coupling dielectric 235 is dimensioned and gapped to achieve optimum impedance for the desired frequency range. For example, for a frequency range of between about 800 MHz and 2 GHz, the shield coupling dielectric 235 has a surface area of about 122 square millimeters, and is gapped at about 0.4 millimeters. The inventive features of the present invention can be adapted with various electronic devices, for example, surge suppressor devices such as the one described in, for example, U.S. Pat. No. 6,061,223 to Jones, et al., entitled "Surge Suppressor Device," which is assigned to the assignee of the present invention. The disclosure of this patent is incorporated by reference herein.

Figure 2:
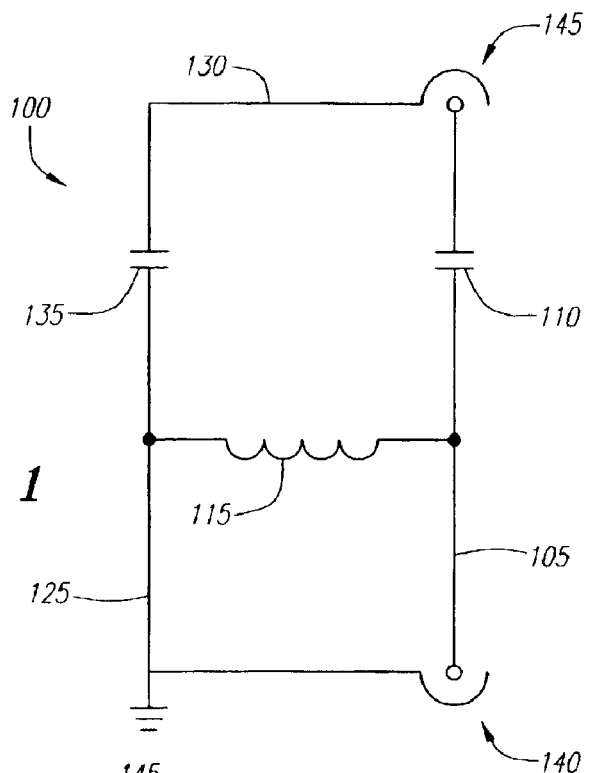
FIG. 2 is a cross-sectional top view of a surge suppressor device according to one embodiment of the present invention.

FIG. 2 is a cross-sectional top view of one possible configuration of the surge suppressor device 100 of FIG. 1.

Figure 3:
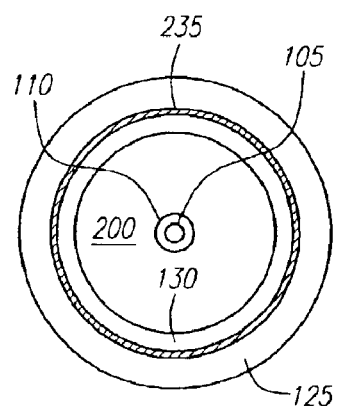
FIG. 3 is a cross-sectional side view taken along line 3—3 of FIG. 2 according to one embodiment of the present invention.

The surge port shield 125 (depicted using \\\\\ hatching) is coupled to the surge port 140 and is positioned around at least a portion of the conductor 105 (see also FIG. 3). The surge port shield 125 is made of a conductive material such as a silver plated brass material or other material that can propagate the ac signals and the dc electrical surges. The protected port shield 130 (depicted using \\\\\ hatching) is coupled to the protected port 145 and is positioned around at least a portion of the conductor 105 and the surge blocking device 110, which includes an inner shield 200 (see also FIG. 3). The protected port shield 130 is made of a conductive material such as a silver plated brass material or other material that can propagate the ac signals. The protected port shield 130 is isolated from the surge port shield 125 and the surge port 140 but provides a means of rf coupling between the surge port shield 125 and the protected port shield 130. The surge blocking device 110 can be used to isolate the surge port 140 from the protected port 145 and the shield coupling dielectric 235 can be used to isolate the protected port shield 130 from the surge port shield 125. The surge port shield 125 can be coupled to or positioned adjacent to (e.g., isolated from) the protected port shield 130.

The surge suppressor device 100 might also include a shield dielectric 205 positioned adjacent to the surge port shield 125 and preferably attached to an inner surface of the surge port shield 125 or an outer surface of the protected port shield 130. Hence, the shield dielectric 205 may be positioned between the protected port shield 130 and the inner shield 200 or the protected port shield 130 and the surge port shield 125. The shield dielectric 205 and the shield coupling dielectric 235 have similar features and have been identified as different elements for illustrative purposes. The shield dielectric 205 and the shield coupling dielectric 235 can be combined and referred to as a dielectric. In one embodiment, the outer surface of the protected port shield 130 can be coated with an insulating material to form the shield dielectric 205. Typically, an air gap is present between the surge port shield 125 and the protected port shield 130, however, by placing a dielectric where the air gap is, the breakdown voltage of the capacitor 135 is increased significantly, thus eliminating ground loops. In one embodiment, the inner surface of the surge port shield 125, the outer surface of the protected port shield 130, the shield dielectric 205, and the shield coupling dielectric 235 are substantially cylindrical in shape and are substantially concentric with the conductor 105.

The shield coupling dielectric 235 and the shield dielectric 205 are preferably made of a material having low loss characteristics such as a Teflon material. The shield coupling dielectric 235 and the shield dielectric 205 may be a Teflon tape, a dielectric coating or any other insulating material. The width and circumference of the shield coupling dielectric 235 and the shield dielectric 205 may be varied to accommodate different frequencies and coupling applications. The thickness of the shield coupling dielectric 235 and the shield dielectric 205 may be varied to increase the dielectric voltage breakdown depending on the dc electrical surge estimated to be received and the desired operating frequencies of the surge suppressor device 100.

By positioning the shield coupling dielectric 235 or the shield dielectric 205 between the protected port shield 130 and the inner shield 200 or the surge port shield 125 and the protected port shield 130, the capacitor 135 is created. The shield coupling capacitor 235 helps to prevent the dc electrical energy or surge on the surge port shield 125 from coupling onto the conductor 105 and the protected port shield 130. Moreover, the shield coupling capacitor 235 prevents the dc electrical energy from reaching the hardware and equipment to be protected.

In addition, the shield coupling capacitor 235 and the shield dielectric 205 help to eliminate fluctuations in the characteristic impedance of the surge suppressor device 100 during lightning and EMP surges and provides a high voltage barrier between the surge port shield 125 and the protected port shield 130. For example, when a surge event occurs, the dc electrical energy is shunted via the inductor 115 to the surge port shield 125, while the shield coupling capacitor 135 and the shield dielectric 205 block the dc electrical energy from coupling to the conductor 105 or the protected port shield 130. That is, during a surge event, the shield coupling capacitor 235 and the shield dielectric 205 filter the dc electrical energy while maintaining a uniform characteristic impedance, e.g., 50 ohms, for the surge suppressor device 100. Furthermore, the shield coupling capacitor 235 and the shield dielectric 205 allow the surge suppressor device 100 to operate at a larger range of operating frequencies per band types. This is achieved by allowing the air gap to be filled with the shield coupling capacitor 235 and the shield dielectric 205 for tuning purposes. The shield dielectric 205 also provides an insulated or floating protected port 145 for preventing ground loop effects during installation and operation of the surge suppressor device 100 and the hardware and equipment.

The surge suppressor device 100 might further include an insulating spacer 210, a locking insulating spacer 215, and a retaining nut 220. The insulating spacer 210 is positioned between the protected port shield 130 and the retaining nut 220. The insulating spacer 210 provides a means for maintaining concentricity and assembly thrust for stacking alignment. The locking insulating spacer 215 is positioned between the surge port shield 125 and the protected port shield 130. The locking insulating spacer 215 is made of a material having high shear strength and dielectric properties and is designed to electrically insulate between the surge port shield 125 and the protected port shield 130 while providing alignment for concentricity, stacking, and preclude torsion effects caused by connector mating. Once the retaining nut 220 is tight, the insulating spacer 210, the surge port shield 125, and the protected port shield 130 are secured together.

Although an exemplary embodiment of the invention has been shown and described, many other changes, combinations, omissions, modifications and substitutions, in addition to those set forth in the above paragraphs, may be made by one having ordinary skill in the art without necessarily departing from the spirit and scope of this invention. Accordingly, the present invention is not intended to be limited by the preferred embodiments, but is to be defined by reference to the appended claims.

What is claimed is:

1. A surge protection device configured to maintain a uniform impedance characteristic comprising:

a housing having a surge port shield and a protected port shield, the surge port shield being positioned adjacent to the protected port shield;

a conductor, positioned within the housing, having a surge port for receiving an rf signal and a surge and a protected port for propagating the rf signal;

a surge blocking device coupled in series between the surge port and the protected port;

a device, coupled to the surge port, for diverting the surge to the surge port shield; and a dielectric positioned between the surge port shield and the protected port shield.

2. The surge protection device of claim 1, wherein a portion of the surge port shield is positioned around a portion of the protected port shield.

3. The surge protection device of claim 1, wherein the conductor is positioned substantially concentric with the protected port shield.

4. The surge protection device of claim 1, wherein the dielectric isolates the surge port shield from the protected port shield to prevent ground loops and to improve the impedance characteristics and the bandwidth of the rf signal.

5. The surge protection device of claim 1, wherein:
the surge blocking device is a capacitor; and
the device is selected from a group consisting of a capacitor, an inductor, a diode, a gas tube, a metal oxide varistor, and a resistor.

6. The surge protection device of claim 1, wherein the surge port shield and the protected port shield provide rf coupling of the rf signal.

7. The surge protection device of claim 1, wherein the dielectric prevents dc current from coupling onto the conductor and the protected port shield.

8. An apparatus comprising:
a conductor having an input portion and an output portion;
an input shield positioned around at least a portion of the input portion of the conductor;
an output shield positioned around at least a portion of the output portion of the conductor;
a capacitor positioned between the input portion of the conductor and the output portion of the conductor; and
a dielectric disposed between the input shield and the output shield for preventing dc current from coupling from the input shield to the output shield.

9. The apparatus of claim 8, wherein:
the conductor is a coaxial conductor;
the input shield is coupled to the input portion of the conductor; and
the output shield is coupled to the output portion of the conductor.

10. The apparatus of claim 8, further comprising a device, coupled to the input portion of the conductor, for diverting dc current to the input shield.

11. The apparatus of claim 8, further comprising a shield dielectric positioned adjacent to the output shield.

12. The apparatus of claim 8, wherein the dielectric helps to eliminate fluctuations in the characteristic impedance during lightning and electromagnetic pulse surges and provides a voltage barrier between the input shield and the output shield.

13. The apparatus of claim 8, further comprising means, coupled to the input portion of the conductor, for diverting a surge to the input shield.

14. The apparatus of claim 13, wherein the means for diverting is an inductor.

15. The apparatus of claim 13, wherein the means for diverting is a diode.

16. A surge protection device comprising:
a conductor for receiving an rf signal and a dc current;
a first shield having a lumen configured to accommodate at least a portion of the conductor;
a second shield having a lumen configured to accommodate the first shield so that a portion of the first shield is positioned within the lumen of the second shield;
a dc blocking device, coupled to the conductor, for attenuating the dc current;
a device, coupled to the conductor, for diverting the dc current to the second shield; and
a dielectric disposed between the first shield and the second shield for preventing the dc current from traveling from the second shield to the first shield.

17. The surge protection device of claim 16, wherein the dc blocking device is a capacitor, which is positioned along the conductor.

18. The surge protection device of claim 16, wherein the first shield and the second shield provide rf coupling of the rf signal.

19. The surge protection device of claim 16, wherein the conductor is positioned substantially concentric with the lumen of the first shield.

20. The surge protection device of claim 16, wherein the dielectric isolates the surge port shield from the protected port shield to prevent ground loops and to improve the impedance characteristics and the bandwidth of the rf signal.

* * * * *